United States Patent [19]
McCreery

[11] 3,815,195
[45] June 11, 1974

[54] ARRANGEMENT FOR LOCATING CUTTING INSERT IN HOLDER

[75] Inventor: James F. McCreery, Latrobe, Pa.

[73] Assignee: Kennametal Inc., Latrobe, Pa.

[22] Filed: May 24, 1973

[21] Appl. No.: 363,602

[52] U.S. Cl. ................................................ 29/96
[51] Int. Cl. ........................................... B26d 1/00
[58] Field of Search ...................................... 29/96

[56]  References Cited
UNITED STATES PATENTS

| | | | |
|---|---|---|---|
| 3,525,136 | 8/1970 | Crosby | 29/96 |
| 3,533,150 | 10/1970 | Welch | 29/96 |
| 3,654,682 | 4/1972 | Newbould | 29/96 |

*Primary Examiner*—Leonidas Vlachos
*Attorney, Agent, or Firm*—Melvin A. Crosby

[57]  ABSTRACT

An arrangement for locating a cutting insert in a holder in which the insert is provided with a hole and the holder has a pocket for receiving the insert with a pin in a bore in the holder having an end which extends into the hole in the insert. The bore in the holder comprises an abutment surface facing in the same general direction as the walls for the insert is thereby clamped against and the pin has an inclined surface eccentric to the axis engaging the abutment. The pin, furthermore, has a region between the abutment and the pocket in which the insert is mounted which fits closely in the bore in the holder. The arrangement provides that rotation of the pin in the bore in the holder will cause the interaction between the abutment and the aforementioned surface on the pin to tilt the end of the pin disposed in the hole in the insert back toward the surfaces against which the insert is to be located thereby pressing the insert firmly against the surfaces. The inclined surface on the pin is inclined in such a direction that the force exerted on the pin by the abutment is inclined in the downward direction whereby simultaneously with locating the insert against the aforementioned surfaces, the pin is drawn downwardly.

11 Claims, 6 Drawing Figures

PATENTED JUN 11 1974　3,815,195

ARRANGEMENT FOR LOCATING CUTTING INSERT IN HOLDER

The present invention relates to cutting tool insert clamping arrangement and is particularly concerned with an arrangement of this nature in which a pin is employed which is rotatable in the holder and which has an end extending into a hole in the insert.

Pin type insert locking arrangements are known and include a number of different arrangements for moving the pin and insert relatively to clamp the insert in the pocket provided therefor in the holder.

The present invention is concerned with an insert locking arrangement of the type referred to in which improved clamping results are obtained by the use of a specially configured pin and a special abutment arrangement provided in the holder for engagement with the pin to tilt the pin in locking direction.

An object of the present invention is the provision of a pin type cutting insert locking arrangement in which improved clamping of the insert in the holder is obtained.

Another object of the present invention is the provision of a pin type cutting insert locking arrangement in which the pin is caused to tilt directly toward the surface, or surfaces, of the pocket containing the insert against which the insert is to be clamped.

These and other objects and advantages of the present invention will become more apparent upon reference to the following detailed specification taken in connection with the accompanying drawings in which.

BRIEF SUMMARY OF THE INVENTION

In the practice of the present invention, a tool holder is provided with a pocket for receiving an insert. The pocket has a flat bottom wall and at least one side wall substantially perpendicular to the bottom wall. A bore in the holder intersects the pocket and an insert in the pocket has a hole which is in substantial registration with the bore. A pin is mounted in the bore in the holder and has an end part extending into the hole in the insert.

A portion of the pin is substantially spherical and fits closely within the bore and defines a tilting axis for the pin. A region along the pin on the opposite side of the spherical region from the end part which goes in the insert is eccentric and the eccentric region of the pin is joined with the other portion of the pin by conical surfaces.

An abutment pin is mounted in the holder and intersects the bore and is disposed adjacent the eccentric portion of the pin and is so located axially as to be engageable with the conical surface leading from the lower end of the eccentric portion to the main part of the pin. When the pin is rotated on its axis, the abutment pin engages the conical surface adjacent thereto and causes tilting of the pin about the spherical portion thereof.

The abutment pin is so located that the upper end of the pin will tilt backwardly toward the wall of the pocket which is perpendicular to the bottom wall thereof and in this manner the insert is forced to firmly back against the said wall. At the same time, the conical portion engages the abutment pin below the horizontal plane of the center thereof thereby the force acting on the pin is directed downwardly at an angle and has one component which tilts the pin and another component which urges the pin downwardly in the bore in the holder.

The pin locking arrangement of the present invention can be used with or without a top clamp clamping the insert down against the bottom wall of the pocket. Where the operation being performed is in the form of a relatively heavy cut, the top clamp on the insert is desirable and also where a high degree of precision in respect of locating the insert in the pocket is desired is preferable to employ a top clamp on the insert. For light turning operations, the pin alone may be sufficient to hold the insert in the pocket.

DETAILED DESCRIPTION OF THE INVENTION

Figure 1:
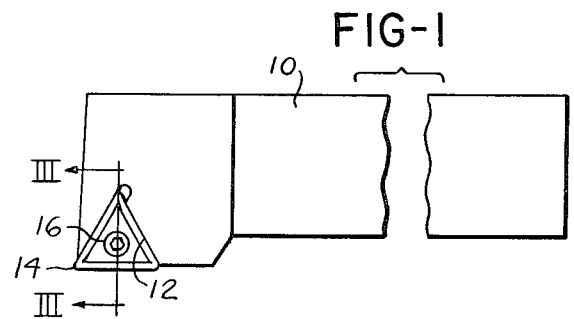
FIG. 1 is a plan view of a typical tool holder and insert having a clamp pin according to the present invention.
Figure 2:
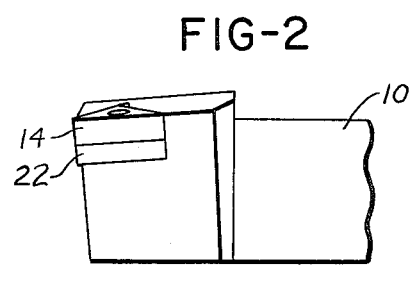
FIG. 2 is a side view of the insert end of the holder.
Figure 5:
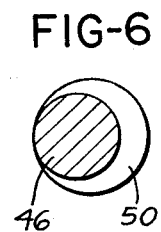
FIG. 5 is a side view of the clamp pin of the present invention.

In FIG. 1, the tool holder 10 comprises an elongated shank portion adapted for clamping in a suitable support while the outer end the tool holder is formed with a pocket 12 adapted for receiving an insert 14 which is held in position in the pocket by a clamp pin 16.

Figure 3:
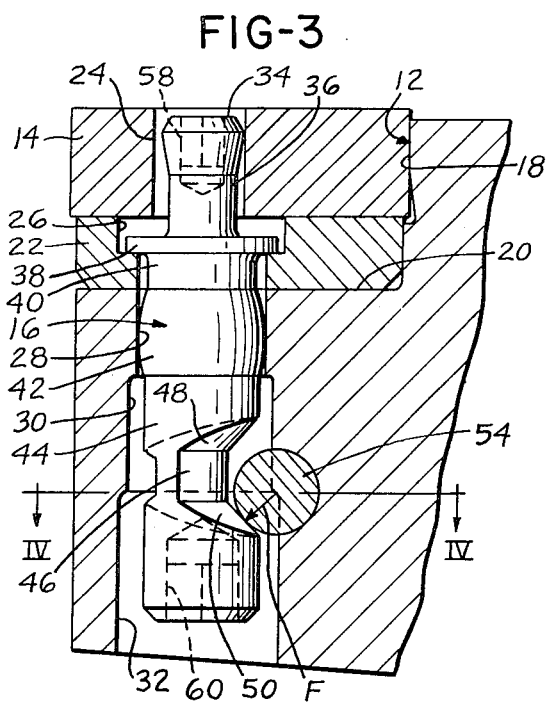
FIG. 3 is a vertical sectional view indicated by line III—III on FIG. 1, and drawn at enlarged scale.

As will be seen in FIG. 3, the pocket 12 has a substantially perpendicular back wall 18 and a bottom wall 20 in a plan perpendicular to the plane of the back wall. In the bottom of the pocket is a shim 22 which may be of hard wear resistant material such as cemented tungsten carbide and resting thereon is the aforementioned insert 14 and which is also formed of a hard wear resistant material such as a cemented hard metal carbide or a ceramic, although it could also be a hard steel.

The insert has a hole 24, preferably central, for receiving the upper end of the clamp pin 16 and the shim 22 has a shouldered hole 26 through which the clamp pin extends while the holder has a bore into which the clamp pin extends and which comprises a smaller diameter upper portion 28, a somewhat larger diameter intermediate portion 30 and a still larger diameter lower portion 32.

The clamp pin itself comprises an extreme upper end portion in hole 24 which consists of a head 34 at the upper end which is somewhat convex outwardly and a neck portion 36 smaller in diameter than the head portion and extending downwardly therefrom. At the lower end of neck portion 36 there is a collar or radial flange 38 that fits loosely within the larger diameter portion of hole 26 in shim 22 but is larger than the smaller diameter portion of the hole.

Immediately below flange 38 is another neck portion 40 which fits loosely within the smaller diameter portion of the hole 26 and insert 22 and immediately beneath neck portion 40 is a substantially spherical portion 42 which fits relatively closely in the smaller diameter portion 28 in the bore of the holder.

Figure 6:
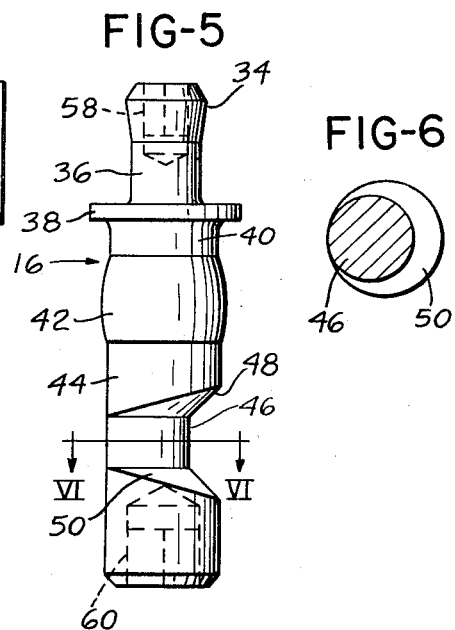
FIG. 6 is a plan section indicated by line VI—VI on FIG. 5.

Extending downwardly from the bottom of spherical portion 42 is a cylindrical extension 44 and in about the center of which is an eccentric region 46 which merges with an uppermost inclined surface region 48 and a lowermost inclined surface region 50. The inclined regions 48 and 50 may be surfaces that would be developed by cones eccentric to the axis of the pin 16 and intersected by the cylindrical extension 44 of the pin and the eccentric region 46 of the pin and which, as will be seen in FIG. 6, is also substantially cylindrical.

Extending through the holder on an axis substantially perpendicular to the axis of the bore in the holder that receives pin 16 is another bore 52 in which a pin 54 is mounted. Pin 54 may be threaded at 56 and engage corresponding threads near the bottom of bore 52, but it is also possible for pin 54 to be press fitted into bore 52. Pin 54 may be a solid pin, as illustrated, or it may be in the form of a roll pin of adequate strength to resist the forces exerted thereon.

As will be seen in FIG. 3, pin 54 is offset radially from the axis of the bore in the holder so the pin fits into the recess in clamp pin 16 disposed between the inclined surfaces 48 and 50. Pin 54 is axially offset relative to surfaces 48 and 50 to such a degree that when insert 14 is placed in pocket 12 and the clamp pin is rotated, the lower inclined surface region 50 will engage pins 54 and a force will be developed on clamp pin 16 substantially in the direction of arrow F.

This force will tilt the clamp pin about substantially the center of spherical portion 42 and will cause head 34 to move backwardly in pocket 12 and to press insert 14 firmly against the lateral walls of the pockets. At the same time, the pin 16 is thrust downwardly firmly.

It will be noted that the radially outermost region of head 34 engages insert 14 substantially above the central plane thereof which is parallel to the top and bottom faces of the insert so that the insert is held against tilting upwardly in the front while, furthermore, when the insert is inverted in the pocket, it will still be engaged by the pin above the central plane of the insert.

The pin 16 preferably has hexagonal sockets 58 in the upper end and 60 in the lower end, either of which can receive a wrench so that the pin can be rotated to clamp an insert in pocket 12 or to release the insert therefrom.

Normally, rotation of the clamp pin 16 about 60° in either direction from a neutral position will effect firm clamping of the insert in the pocket, but lesser amounts of rotation or greater amounts of rotation of the clamp pin is, of course, possible, if the insert being clamped up in the holder is slightly different in size from the one illustrated. In every case, it is contemplated that the stationary pin 54 will engage only the inclined lower surface 50 of the clamp pin whereby the force F exerted on the clamp pin will always be downwardly inclined.

A particular advantage of the present invention is that the abutment pin element which the pin engages as the pin is rotated to cause the pin to tilt can be rotated to cause the pin to tilt in exactly the proper direction to clamp the insert in the pocket.

Figure 4:
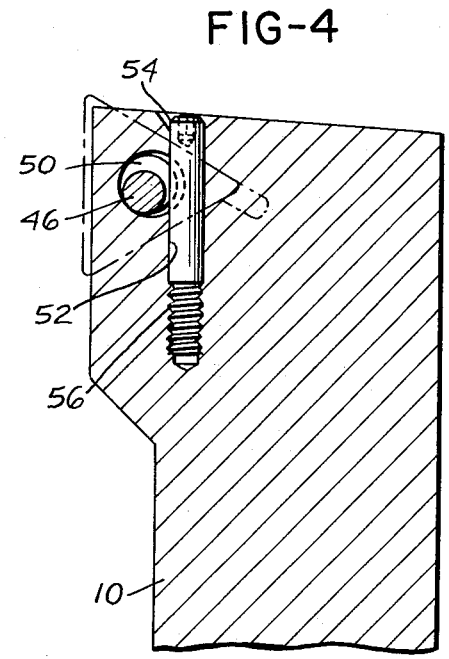
FIG. 4 is a plan sectional view indicated by line IV—IV on FIG. 3.

If the pocket for the insert has only a single wall, the insert can tilt straight back toward the single wall in the direction perpendicular thereto. If the holder has two angularly related walls as, for example, shown in FIGS. 1 and 4 of the drawings, the pin can be caused to tilt directly toward the juncture of the two walls, thereby insuring that the insert will be pressed firmly against both of the walls.

The pin 16 has been referred to as a clamp pin and may, indeed, serve as the sole means for clamping the insert in the pocket when the cutting operation to be carried out by the insert is quite light, such as a finishing operation or the like. However, where heavier cuts are being taken, it is preferred for the insert to be held down against the bottom wall of the pocket by a top clamp carried by the holder and adjustable downwardly into firm engagement with the upper face of the insert.

In any case, the pin 16 carried by the holder and having an upper end region protruding into the pocket for engagement with a hole in the insert serves as a locating pin to push the insert back against the peripheral wall means disposed on the opposite side of the insert pocket from the open side thereof.

This peripheral wall means may consist of a single wall in which case the locating pin will tilt in a plane substantially perpendicular thereto or the peripheral wall means may advantageously include a pair of angularly related walls, and in which case the locating pin would preferably tilt in a plane which bisects the included angle between the angularly related walls.

It will be evident that the assembly of the locating pin with the holder is a simple procedure. The pin is introduced into the bore in the holder from above and then, when the reaction pin 54 is put in place, it will extend transversely through the undercut formed in the locating pin and will loosely retain the locating pin in the holder. Removal of the reaction pin will, of course, permit the locating pin to be removed from the holder.

The engagement of the reaction pin with the inclined eccentric surface 50 is important because many times the reaction pins are wrenched from the lower end, and it is possible, when the locating pin is wrenched in this manner, for the insert to be held in the pocket less firmly than is desired.

However, with the force developed by the reaction pin on the locating pin disposed in such a direction that it converges with the axis of the locating pin in the downward direction, the force exerted on the locating pin to push the insert back toward the peripheral wall means of the pocket is always accompanied by a downward thrust on the locating pin, and the insert is, therefore, always properly located in the pocket both with respect to the peripheral walls and with respect to the bottom wall of the pocket.

Modifications may be made within the scope of the appended claims.

I claim:

1. A locating device for locating a cutting insert in the pocket of a holder, said pocket having an upwardly facing bottom wall and being open on one side and having peripheral wall means on the other side, a bore in the holder extending downwardly through the bottom wall of the pocket, a locating pin in said bore having an upper axial region protruding into the pocket for engagement with a hole in an insert in the pocket and an outwardly convex intermediate axial region closely fitting the upper portion of said bore and a lower axial region which has substantial radial clearance in the lower portion of said bore, said lower region of said locating pin having an outwardly convex upwardly and inwardly inclined eccentric surface formed thereon, and a reaction pin mounted in said holder and extending transversely across said bore on the same side of the axis of said bore as the peripheral wall means of said pocket, said reaction pin having the side facing the axis of said bore adjacent said inclined surface whereby rotation of said locating pin in said bore will cause said surface to engage said reaction pin and develop a force on said locating pin which converges with the axis of the locating pin in the downward direction.

2. A locating device according to claim 1 in which said surface is a portion of the surface of a cone.

3. A locating device according to claim 1 in which said surface is a portion of the surface of a cone having an axis parallel to and radially offset from the axis of the locating pin.

4. A locating device according to claim 1 in which said undercut includes an axial surface on said locating pin extending upwardly from the radially inner edge of said inclined surface.

5. A locating device according to claim 1 in which said undercut includes an axial surface on said locating pin extending upwardly from the radially inner edge of said inclined surface, said axial surface comprising a cylindrical surface formed on said lower region of said pin about an axis offset radially from the axis of the locating pin.

6. A locating device according to claim 1 in which said upper axial region of said pin comprises a radial flange at the lower end and a portion of reduced diameter extending upwardly from the flange, said portion having a bulbous upper end.

7. A locating device according to claim 1 in which said peripheral wall means comprises a pair of angularly related walls and said reaction pin extends substantially at right angles to the bisector of the angle between said angularly related walls.

8. A locating device according to claim 1 in which said locating pin includes a bulbous portion near the upper end of said upper axial region having a greatest diameter for engagement with the hole in an insert in said pocket, said axially intermediate region being about midway between said greater diameter and said reaction pin.

9. A locating device according to claim 1 in which said locating pin comprises an eccentric undercut forming said surface thereon, said reaction pin screw threadedly engaging said holder and extending through said undercut so as loosely to retain the locating pin in the bore, removal of said reaction pin from said holder permitting said locating pin to be removed from said bore.

10. A locating device according to claim 1 in which said upper portion of said bore in which said axially intermediate region of said locating pin is disposed is smaller in diameter than the said lower portion of said bore.

11. A locating device according to claim 1 in which said locating pin includes means at at least one end thereof for engagement by a wrench for rotating the locating pin.

* * * * *